US008103704B2

(12) United States Patent
Abrams

(10) Patent No.: US 8,103,704 B2
(45) Date of Patent: Jan. 24, 2012

(54) METHOD FOR DATABASE CONSOLIDATION AND DATABASE SEPARATION

(75) Inventor: Helene Abrams, Orlando, FL (US)

(73) Assignee: ePrentise, LLC, Orlando, FL (US)

( * ) Notice: Subject to any disclaimer, the term of this patent is extended or adjusted under 35 U.S.C. 154(b) by 727 days.

(21) Appl. No.: 11/831,574

(22) Filed: Jul. 31, 2007

(65) Prior Publication Data

US 2009/0037488 A1 Feb. 5, 2009

(51) Int. Cl.
*G06F 7/20* (2006.01)
*G06F 7/04* (2006.01)

(52) U.S. Cl. ......................................... 707/809; 707/811
(58) Field of Classification Search .................. 707/100, 707/200, 692, 999.201, 809, 811
See application file for complete search history.

(56) References Cited

U.S. PATENT DOCUMENTS

| | | | |
|---|---|---|---|
| 5,010,478 A * | 4/1991 | Deran ........................... | 707/100 |
| 5,278,978 A | 1/1994 | Demers et al. | |
| 5,379,419 A | 1/1995 | Heffernan | |
| 5,416,917 A | 5/1995 | Adair et al. | |
| 5,497,486 A | 3/1996 | Stolfo et al. | |
| 5,566,332 A | 10/1996 | Adair et al. | |
| 5,596,746 A | 1/1997 | Shen et al. | |
| 5,642,505 A | 6/1997 | Fushimi | |
| 5,664,109 A | 9/1997 | Johnson et al. | |
| 5,668,897 A | 9/1997 | Stolfo | |
| 5,708,828 A | 1/1998 | Coleman | |
| 5,717,915 A | 2/1998 | Stolfo et al. | |
| 5,745,703 A | 4/1998 | Cejtin et al. | |
| 5,748,780 A | 5/1998 | Stolfo | |
| 5,966,704 A | 10/1999 | Furegati et al. | |
| 5,970,490 A | 10/1999 | Morgenstern | |
| 6,151,608 A | 11/2000 | Abrams | |
| 6,295,539 B1 | 9/2001 | Isip, Jr. | |
| 6,295,561 B1 | 9/2001 | Nagy | |
| 6,370,646 B1 | 4/2002 | Goodman et al. | |
| 6,377,952 B1 | 4/2002 | Inohara et al. | |
| 6,397,232 B1 | 5/2002 | Cheng-Hung et al. | |
| 6,427,143 B1 | 7/2002 | Isip et al. | |
| 6,842,905 B2 | 10/2002 | Knutson et al. | |
| 6,792,431 B2 | 1/2003 | Tamboli et al. | |
| 7,092,950 B2 | 3/2003 | Wong et al. | |
| 6,546,404 B1 | 4/2003 | Davis et al. | |
| 6,567,823 B1 | 5/2003 | Rothschild | |
| 7,120,896 B2 | 5/2003 | Budhiraja et al. | |
| 6,766,335 B2 | 6/2003 | Kukura et al. | |
| 6,615,220 B1 | 9/2003 | Austin et al. | |
| 6,636,861 B1 | 10/2003 | Stack | |
| 6,938,058 B2 | 10/2003 | Henrickson et al. | |
| 6,901,418 B2 | 11/2003 | Gonos | |
| 6,714,935 B1 | 3/2004 | Delo | |
| 6,728,722 B1 | 4/2004 | Shaylor | |
| 7,162,628 B2 | 7/2004 | Gentil et al. | |
| 6,804,689 B1 | 10/2004 | Havrda et al. | |

(Continued)

OTHER PUBLICATIONS

A. Jones, H. Abrams, "How British Telecom Keeps Pace With Constantly Changing Business Requirements", 2001, British Telecom/Crystallize.*

(Continued)

*Primary Examiner* — Jacob F Betit
*Assistant Examiner* — Sheryl Holland

(57) ABSTRACT

Methods for consolidating databases while maintaining data integrity are disclosed. A source database and target database are compared, and consolidated, and the consolidated databases are used. In other examples, a database is split to support divested entities.

14 Claims, 9 Drawing Sheets

Database Consolidation Process Diagram

U.S. PATENT DOCUMENTS

| | | | |
|---|---|---|---|
| 7,058,615 B2 | 10/2004 | Yao | |
| 7,143,105 B2 | 12/2004 | Nakano | |
| 6,865,579 B1 | 3/2005 | Shaylor | |
| 6,912,539 B1 | 6/2005 | Kapitanski et al. | |
| 6,915,287 B1 | 7/2005 | Felsted et al. | |
| 6,996,589 B1* | 2/2006 | Jayaram et al. | 707/204 |
| 6,999,956 B2* | 2/2006 | Mullins | 707/2 |
| 7,054,833 B1 | 5/2006 | McDonald | |
| 7,058,646 B1 | 6/2006 | Loboz et al. | |
| 7,103,619 B1 | 9/2006 | Rajpurkar et al. | |
| 7,133,868 B1 | 11/2006 | Ruest | |
| 7,194,569 B1 | 3/2007 | Shaylor | |
| 7,505,991 B2* | 3/2009 | Fifield et al. | 707/102 |
| 2003/0171953 A1 | 9/2003 | Narayanan et al. | |
| 2003/0233252 A1 | 12/2003 | Haskell et al. | |
| 2004/0039720 A1* | 2/2004 | Hodges et al. | 707/1 |
| 2004/0064343 A1 | 4/2004 | Korpman et al. | |
| 2004/0172297 A1 | 9/2004 | Rao et al. | |
| 2004/0204964 A1 | 10/2004 | Moore et al. | |
| 2005/0137910 A1 | 6/2005 | Rao et al. | |
| 2005/0192838 A1 | 9/2005 | Jones et al. | |
| 2005/0228808 A1* | 10/2005 | Mamou et al. | 707/100 |
| 2006/0074991 A1* | 4/2006 | Lussier et al. | 707/200 |
| 2006/0159077 A1* | 7/2006 | Vanecek, Jr. | 370/360 |
| 2006/0277215 A1 | 12/2006 | Siegel | |
| 2006/0287890 A1* | 12/2006 | Stead et al. | 705/3 |
| 2007/0027715 A1 | 2/2007 | Gropper et al. | |
| 2007/0033066 A1 | 2/2007 | Ammer et al. | |
| 2007/0061169 A1 | 3/2007 | Lorsch | |
| 2007/0061170 A1 | 3/2007 | Lorsch | |
| 2007/0118613 A1* | 5/2007 | Festa et al. | 709/217 |
| 2007/0124310 A1 | 5/2007 | Mathur | |
| 2007/0150311 A1 | 6/2007 | Lazerus | |
| 2007/0283287 A1* | 12/2007 | Taylor et al. | 715/769 |

OTHER PUBLICATIONS

Lee et al., "Web Services Implementation Methodology for SOA Application", 2006, IEEE.*

"Database Storage Consolidation", Oct. 2005, Oracle.*

"Crystallize, Inc. Complete Integration to Oracle Applications; Crystallized Software Integrates With Oracle Applications to Provide Industry-Leading Business Change Solutions", Apr. 25, 2000, Business Wire.*

"Data Migration Best Practices", Jan. 2006, Oracle, NetApp, www.netapp.com.*

Lukovic et al, "Database Schema Integration Process—A Methodology and Aspects of Its Applying", 2006, University of Novi Sad.*

"Crystallize, Inc. Named by Computerworld as Emerging Company to Watch in 2001", Nov. 20, 2000, Business Wire.*

M. Beck-Friis, "SAP Master Data Management", 2006, SAP.*

P. Russom, "Best Practices in Data Migration", Apr. 2006, The Data Warehousing Institute.*

Nasirh, "Oracle E-Business Suite Knowledge Source—A.I.M. Document Deliverables", Jul. 6, 2007, ebusinessuite.wordpress.com.*

Helene Abrams, ePrentise, LLC; The Oracle Applications "Tax"; Sep. 18, 2007; c2010 eprentise; www.eprentise.com.

Helene Abrams; Yours , Mine, and Ours: What to disclose and what to keep private during divestiture; TECHanges, Oct. 2007,c2008 eprentise; www.eprentise.com.

Donald W. Rhew, 1936- (author of anon. contribution) Step by step : real life experience with cerebral palsy / Colleen Rose. Imprint.

Xerox Corporation; Step by step guide lite : to virtual classroom learning.; Jan. 31, 2000.

Helene Abrams; Crystallize, Inc.; Step by step guide for going global; Apr. 25, 2000.

Patricia M. McKeague; Step by step : writing about literature; Mar. 19, 1999 : Dubuque : Kendall/Hunt Pub. Co., c1999.

Helene Abrams; Crystallize, Inc.; The challenge of change: achieve flexibility with oracle applications; Jun. 8, 2001.

Amy Helen Johnson, Computerworld; Making Oracle applications easier; Computerworld Mar. 19, 2001.

Adrian Jones & Helene Abrams; How British Telecom Keeps Pace With Constantly Changing Business Requirements; c2001 BT plc & Crystallize, Inc.

Helene Abrams, ePrentise, LLC; 1 + 1 = 12: A Look at *Migration* vs. *Consolidation*; Sep. 30, 2010 c2010 eprentise; www.eprentise.com.

Helene Abrams, ePrentise, LLC; Our Secret Sauce; Apr. 4, 2010; c2010 eprentise; www.eprentise.com.

Helene Abrams, ePrentise, LLC; Taking Advantage of R12 Functionality with a Single Chart of Accounts and a Single Instance; Mar. 16, 2010; c2010 eprentise; www.eprentise.com.

Helene Abrams, ePrentise, LLC; That Old House; Mar. 10, 2010; c2010 eprentise; www.eprentise.com.

Helene Abrams, ePrentise, LLC; Getting the CFO to Pick Up His Bottom . . . Line: Best Practices in Cutting Costs; Feb. 16, 2010 c2010 eprentise; www.eprentise.com.

Helene Abrams, ePrentise, LLC; Everyone Takes the Hit: What You Can Do About It—5 Key Business Metrics and Oracle E—Business Suite; Jan. 19, 2010 c2010 eprentise; www.eprentise.com.

Helene Abrams, ePrentise, LLC; Show Me the Money: Reduce the Costs of Running Oracle EBS Before Upgrading to R12; Jan. 19, 2010 c2010 eprentise; www.eprentise.com.

Helene Abrams, ePrentise, LLC; It's 11i . . . Do You Know Where Your Children Are?; Dec. 16, 2009; c2010 eprentise; www.eprentise.com.

Helene Abrams, ePrentise, LLC; Globalized Financials in R12: Avoiding the Risk of Nuclear Disaster; Nov. 10, 2009; c2010 eprentise; www.eprentise.com.

Helene Abrams, ePrentise, LLC; Hitting the Reset Button for R12: *The Upgrade* vs. *Reimplement Decision*; Oct. 20, 2009; c2010 eprentise; www.eprentise.com.

Helene Abrams, ePrentise, LLC; Not Your Mother's Software; Sep. 16, 2009; c2010 eprentise; www.eprentise.com.

Helene Abrams, ePrentise, LLC; Is Your ERP System Killing Your Business?; Sep. 15, 2009; c2010 eprentise; www.eprentise.com.

Helene Abrams, ePrentise, LLC; Details and Setup of Other Flexfields in Oracle E—Business Suite; Aug. 18, 2009; c2010 eprentise; www.eprentise.com.

Helene Abrams, ePrentise, LLC; Apples to Oranges: What is Your Financial Consolidation Comparing?; Jul. 13, 2009; c2010 eprentise; www.eprentise.com.

Helene Abrams, ePrentise, LLC; Organization Setup in R12; Jun. 15, 2009; c2010 eprentise; www.eprentise.com.

Helene Abrams, ePrentise, LLC; Growing Complexity Limits Business Value; Apr. 19, 2009; c2010 eprentise; www.eprentise.com.

Helene Abrams, ePrentise, LLC; When Projects Go Sour; Mar. 19, 2009; c2010 eprentise; www.eprentise.com.

Helene Abrams, ePrentise, LLC; Don't Walk Away from $15,450,000; Mar. 13, 2009; c2010 eprentise; www.eprentise.com.

Helene Abrams, ePrentise, LLC; Putting Numbers in Boxes: Spring Cleaning for Charts of Accounts—Part II; Feb. 10, 2009; c2010 eprentise; www.eprentise.com.

Helene Abrams, ePrentise, LLC; An Overview of R12 Ledgers; Jan. 20, 2009; c2010 eprentise; www.eprentise.com.

Helene Abrams, ePrentise, LLC; Putting Numbers in Boxes: Spring Cleaning for Charts of Accounts—Part I; Jan. 10, 2009; c2010 eprentise; www.eprentise.com.

Helene Abrams, ePrentise, LLC; Leveraging Purchasing in a Mult—Org Environment; Dec. 10, 2008; c2010 eprentise; www.eprentise.com.

Helene Abrams, ePrentise, LLC; The Bridge to Nowhere; Sep. 18, 2008; c2010 eprentise; www.eprentise.com.

Helene Abrams, ePrentise, LLC; Under the Covers with Subledger Accounting; Aug. 10, 2008; c2010 eprentise; www.eprentise.com.

Helene Abrams, ePrentise, LLC; Operating a Shared Service Center in R12 Using EBS; Jul. 10, 2008; c2010 eprentise; www.eprentise.com.

Helene Abrams, ePrentise, LLC; Agility by Design: Finished But Not Done; Jun. 10, 2008; c2010 eprentise; www.eprentise.com.

Helene Abrams, ePrentise, LLC; Agility by Design: Building Software to Last; May 13, 2008; c2010 eprentise; www.eprentise.com.

Helene Abrams, ePrentise, LLC; Change as a Growth Enabler; May 10, 2008; c2010 eprentise; www.eprentise.com.

Helene Abrams, ePrentise, LLC; How to Grow Your Business During a Recession; Apr. 20, 2008; c2010 eprentise; www.eprentise.com.

Helene Abrams, ePrentise, LLC; R12 Financials Overview; Apr. 20, 2008; c2010 eprentise; www.eprentise.com.

Helene Abrams, ePrentise, LLC; The CHANGE TEST UPGRADE Advantage; Apr. 20, 2008; c2010 eprentise; www.eprentise.com.

Helene Abrams, ePrentise, LLC; Inside Out: Back Office Systems Have Become Gateways to the External Community; Mar. 17, 2008; c2010 eprentise; www.eprentise.com.

Helene Abrams, ePrentise, LLC; Into the Future (And Back Again); Mar. 16, 2008; c2010 eprentise; www.eprentise.com.

Helene Abrams, ePrentise, LLC; Adding Value by Subtracting: Maximizing Divestiture Gains; Feb. 8, 2008; c2010 eprentise; www.eprentise.com.

Helene Abrams, ePrentise, LLC; The Truth, the whole Truth, and Nothing But the Truth; Jan. 20, 2008; c2010 eprentise; www.eprentise.com.

Helene Abrams, ePrentise, LLC; Going Green in ERP; Jan. 20, 2008; c2010 eprentise; www.eprentise.com.

Helene Abrams, ePrentise, LLC; Breakin' Up is Hard to Do; Dec. 19, 2007; c2010 eprentise; www.eprentise.com.

Helene Abrams, ePrentise, LLC; The On-Ramp to Service-Oriented Architecture; Dec. 8, 2007; c2010 eprentise; www.eprentise.com.

Helene Abrams, ePrentise, LLC; What Would Happen if You Sold Part of Your Business?; Nov. 18, 2007; c2010 eprentise; www.eprentise.com.

Helene Abrams, ePrentise, LLC; The Bottom Line: Where's the Money?; Nov. 11, 2007; c2010 eprentise; www.eprentise.com.

Helene Abrams, ePrentise, LLC; Advantages of Subledger Accounting in R12; Oct. 20, 2007; c2010 eprentise; www.eprentise.com.

Helene Abrams, ePrentise, LLC; ERP Systems: The Next Legacy Dinosaur?;Oct. 20, 2007; c2010 eprentise; www.eprentise.com.

Helene Abrams, ePrentise, LLC; Before You Upgrade to Release 12—Look at the Data; Sep. 20, 2007; c2010 eprentise; www.eprentise.com.

ePrentise, LLC; Case Study; Oct. 8, 2010; www.eprentise.com.

* cited by examiner

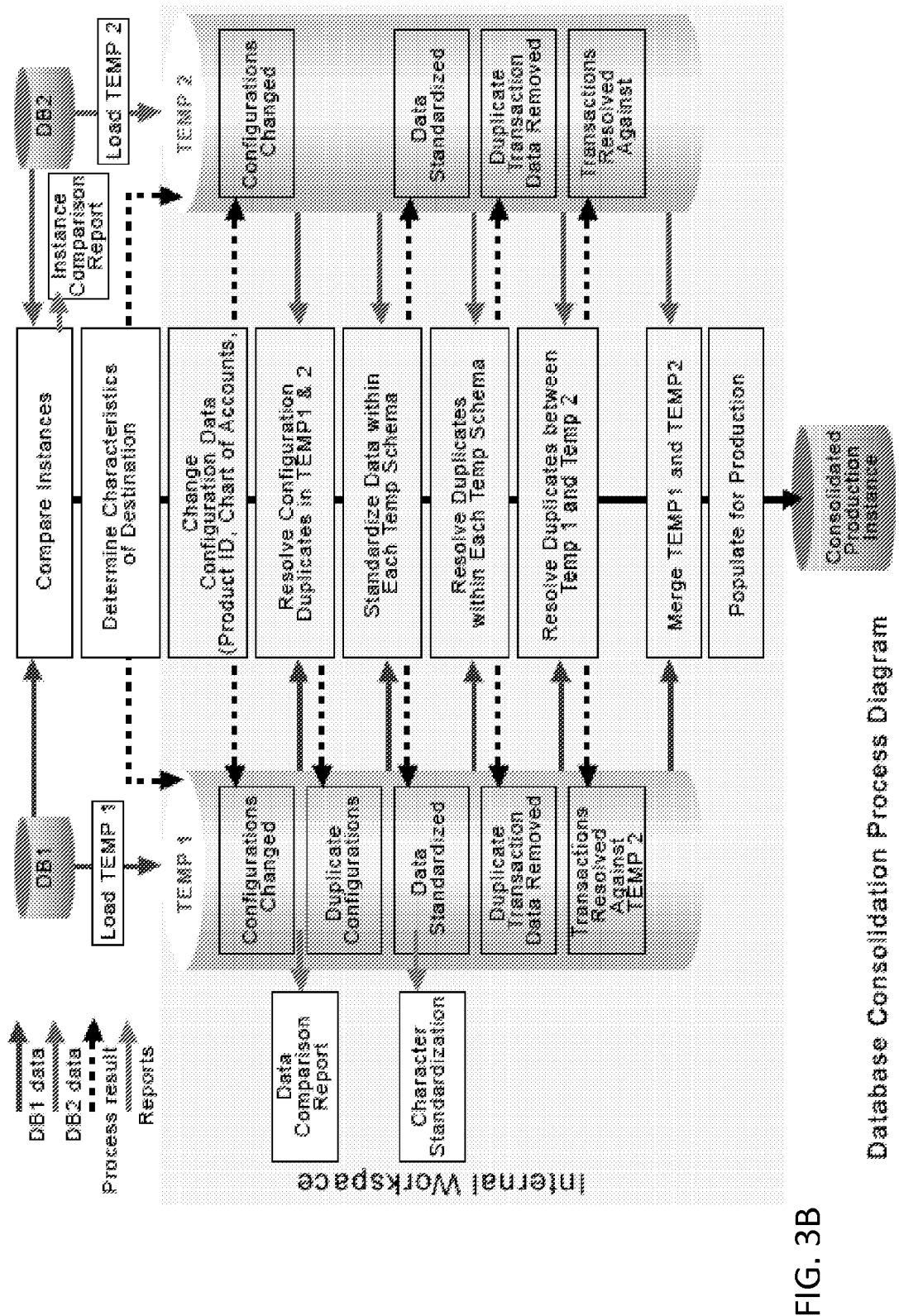
FIG. 3B   Database Consolidation Process Diagram

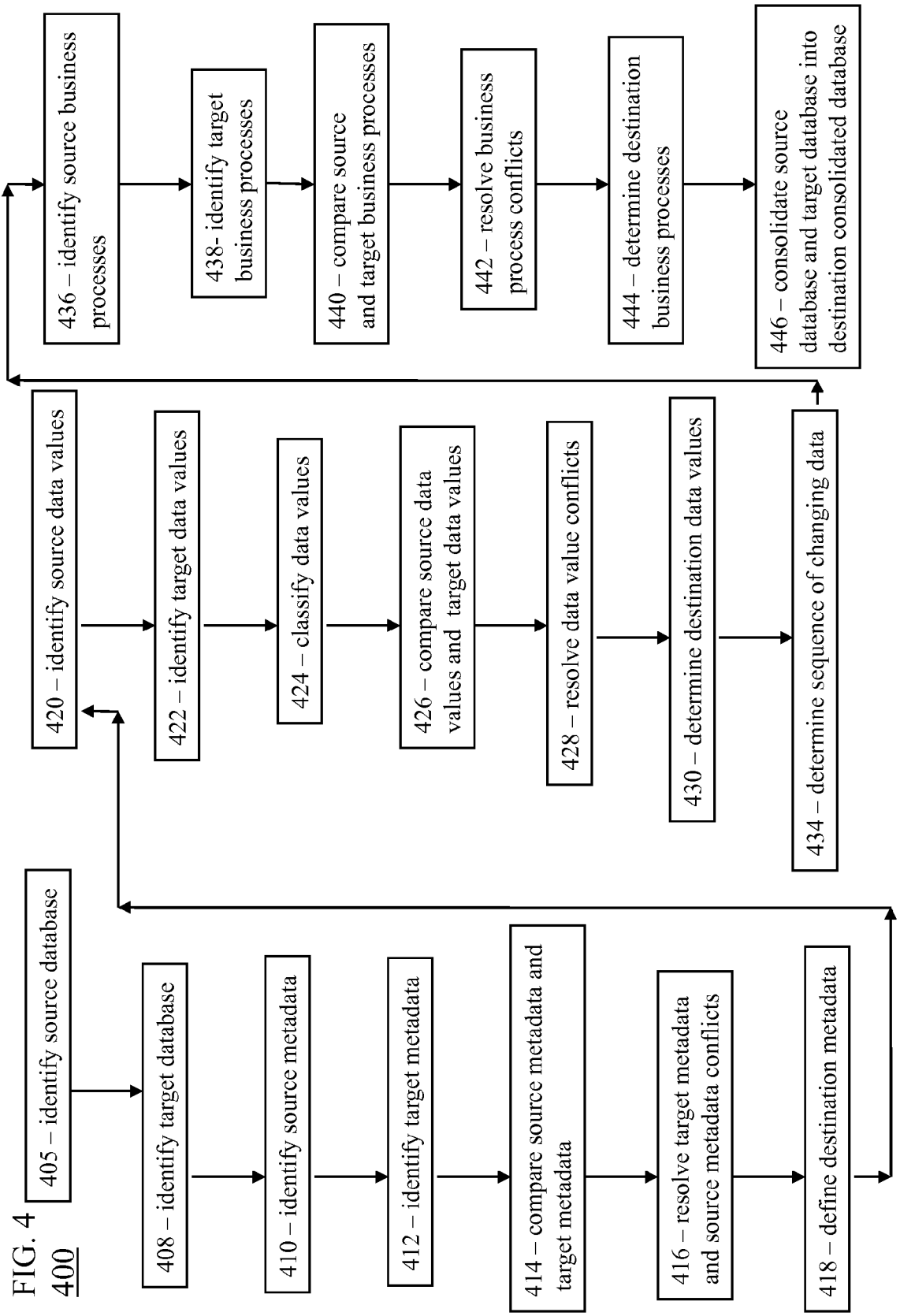

500

600

700

METHOD FOR DATABASE CONSOLIDATION AND DATABASE SEPARATION

FIELD OF INVENTION

The present invention generally relates to databases. More specifically, the invention relates to consolidating and separating databases.

BACKGROUND OF THE INVENTION

Modern businesses rely on computerized databases for operations. When business conditions change, such as during an acquisition or divestiture, database management becomes difficult and presents a challenge to both the acquiring entity, as well as the divested entity.

Prior art attempts to solve this problem have taken two primary forms: integration of data and migration of data. Data integration is performed through methods that include Enterprise Application Integration ("EAI") (FIG. 1) and Service Oriented Architecture ("SOA")(FIG. 2). EAI type solutions typically operate using a 'hub and spoke' architecture to transmit and receive database messages and data values at a client 'hub', and source the data from diverse applications at the spokes. SOA type solutions rely on intricate architectures and loosely coupled services to pass data among applications. In the SOA solutions, resources are made available as independent services. Those services are shared among diverse applications. SOA solutions also suffer from complex data structures, leading to increased latency in communications as well as requiring increased network capacity. Translation of data formats is included in integration methods, but these methods are limited to moving data back and forth. Disparate existing systems remain along with their data and business process inconsistencies and independent maintenance and operational costs.

Data migration includes methods of copying and moving data from a source to a target. Data migration allows for an extract of source data values, transformation of those values, and load into a target database (known as Extract, Transform, and Load—ETL). Data migration technologies typically involve creating programming code that moves data from point 'a' to point 'b' without regard to completeness, correctness, or consistency. The data conforms to the business rules of the target database.

It is therefore a challenge to develop a method to manage database operations that overcomes these, and other, disadvantages.

SUMMARY OF THE INVENTION

A first embodiment of the invention provides a method for consolidating at least one source database and one target database. The invention is a method to synthesize the source and target metadata, the source and target data values, the source and target business processes, and the source and target business rules and results into a single consolidated database. The method includes identifying a source database including source metadata, source data values, source business processes, and source business rules and identifying a target database including target metadata, target data values, target business processes, and target business rules. The method further includes identifying the source metadata to be included in the consolidated database, identifying the target metadata to be included in the consolidated database, comparing the source metadata and the target metadata, and resolving any conflicts between the at least one source metadata and the target metadata based on the comparison. The method further includes defining a destination metadata of a destination consolidated database based on the at least one source metadata, the target metadata, and the resolved conflicts between the source metadata and the target metadata, identifying the source data values of at least one source to be included in the destination consolidated database, identifying the target data values to be included in the destination consolidated database, comparing the source data values and the target data values, and resolving any conflicts between the source data values and the target data values. Additionally, the method includes defining a destination data values of the destination consolidated database based on the source data values, the target data values and the resolved conflicts between the source data values and the target data values, identifying the source business processes and source business rules of at least one source, identifying the target business processes and target business rules, comparing the source business processes and source business rules and the target business processes and target business rules, and resolving any conflicts between the source business processes and source business rules and the target business processes and target business rules based on the comparison. The method further includes defining destination business processes and destination business rules of the destination consolidated database based on the source business processes, source business rules, target business processes, and target business rules, and the resolved conflicts between the source business processes and source business rules and the target business processes and target business rules, and consolidating the at least one source database and target database into a destination consolidated database based on the destination metadata, destination data values, and destination business processes and destination business rules.

A second embodiment of the invention provides a method for consolidating a first database and second base. The method includes comparing the first database and the second database wherein the first database is associated with an acquired company, and wherein the second database is associated with an acquiring company. The method further includes forming a first temporary database based on the first database, forming a second temporary database based on the second database. The method further includes comparing metadata, the data values, and the business processes and rules the first database to that of the second database identifying the differences between the metadata, the data values, and the business processes and rules between the first database and the second database, changing the metadata for the first database and the second database within the temporary databases to match that of the consolidated destination database, changing the data values for the first database and the second database, resolving duplicate data values within each of the first database and the second database, and between the first database and the second database to populate the consolidated destination database, and changing the business rules and processes of the first database and the second database to enforce consistent business processes and rules in the consolidated destination database. An embodiment of the invention analyzes the configuration data values for each of the first temporary database and second temporary database, and resolves inconsistencies that manifest as differences in business processes and rules between the first temporary database and second temporary database. The method further includes adding to and changing the metadata objects within the temporary databases so as not to destroy the relational integrity of the first database and the second database. The method further includes standardizing configuration data values within each of the first temporary database and second temporary database. The method further includes resolving duplicate data values within each of the first temporary database and second temporary database, and populating the first temporary database and second temporary database based on the resolved duplicates into the consolidated destination database for the acquiring and the acquired company.

Another aspect of the invention provides a method for assimilating an acquired company. The method includes acquiring at least one company, wherein the acquired company maintains at least one first database including first metadata, first data values, and first business processes; and the acquiring company maintains at least one second database, the second database including second metadata, second data values, and second business processes. The method further includes identifying the first metadata, second metadata, first data values, second data values, first business processes, and second business processes, comparing the first metadata and second metadata, resolving any conflicts between the first metadata and second metadata based on the comparison, and determining a consolidated destination metadata based on the first source metadata, second metadata and resolved conflicts between the first metadata and second metadata. The method further includes comparing the first data and second data values, determining at least one duplicate data candidate based on the comparison, determining whether the duplicate data candidate is a nonduplicate data or a duplicate data, and determining a destination data values based on the first data values, second data values, determined duplicate data, and determined nonduplicate data. The method further includes comparing the first business process and second business process, resolving any conflicts between the first business process and second business process based on the comparison, determining a destination business process based on the first business process, second business process and resolved conflicts between the first business process and second business process, and consolidating the first database and second database into a destination database based on the destination metadata, destination data values, and destination business processes. The method further includes assimilating the acquired company based on the consolidated destination database.

Yet another aspect of the invention provides a method for separating at least one source database into at least one other destination database. The method identifying a source database associated with a parent business entity, the source database including source data values, identifying a destination database associated with a separated business entity, the destination database including destination data values, and identifying the data values of the at least one source to be included in the destination database. The method further includes identifying the business rules of at least one source that will be the criteria for filtering out the data values for the at least one destination database and dividing the at least one source database into the at least one destination database based on the identified business rules.

Yet another aspect of the invention provides a method for divesting at least a part of a business entity, the business entity maintaining at least one source database. The method includes identifying a source entity and a separated entity, identifying data values associated only with the separated entity, identifying source data values associated only with the source entity, and establishing a separated database. The method further includes populating the separated database with only the separated data values, establishing a source entity database, and populating the source entity database with the only the source data values. An embodiment of the method is the separated entity database may be a divested business entity as for a divestiture or selling off of a business unit of the parent business entity.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

BRIEF DESCRIPTION OF THE DRAWINGS

FIG. 3B illustrates one embodiment of a graphical depiction of a method for consolidating databases, in accordance with one aspect of the invention FIG. 4 illustrates one embodiment of a method for consolidating databases in accordance with another aspect of the invention;

DETAILED DESCRIPTION OF THE PRESENT INVENTION

Figure 1:
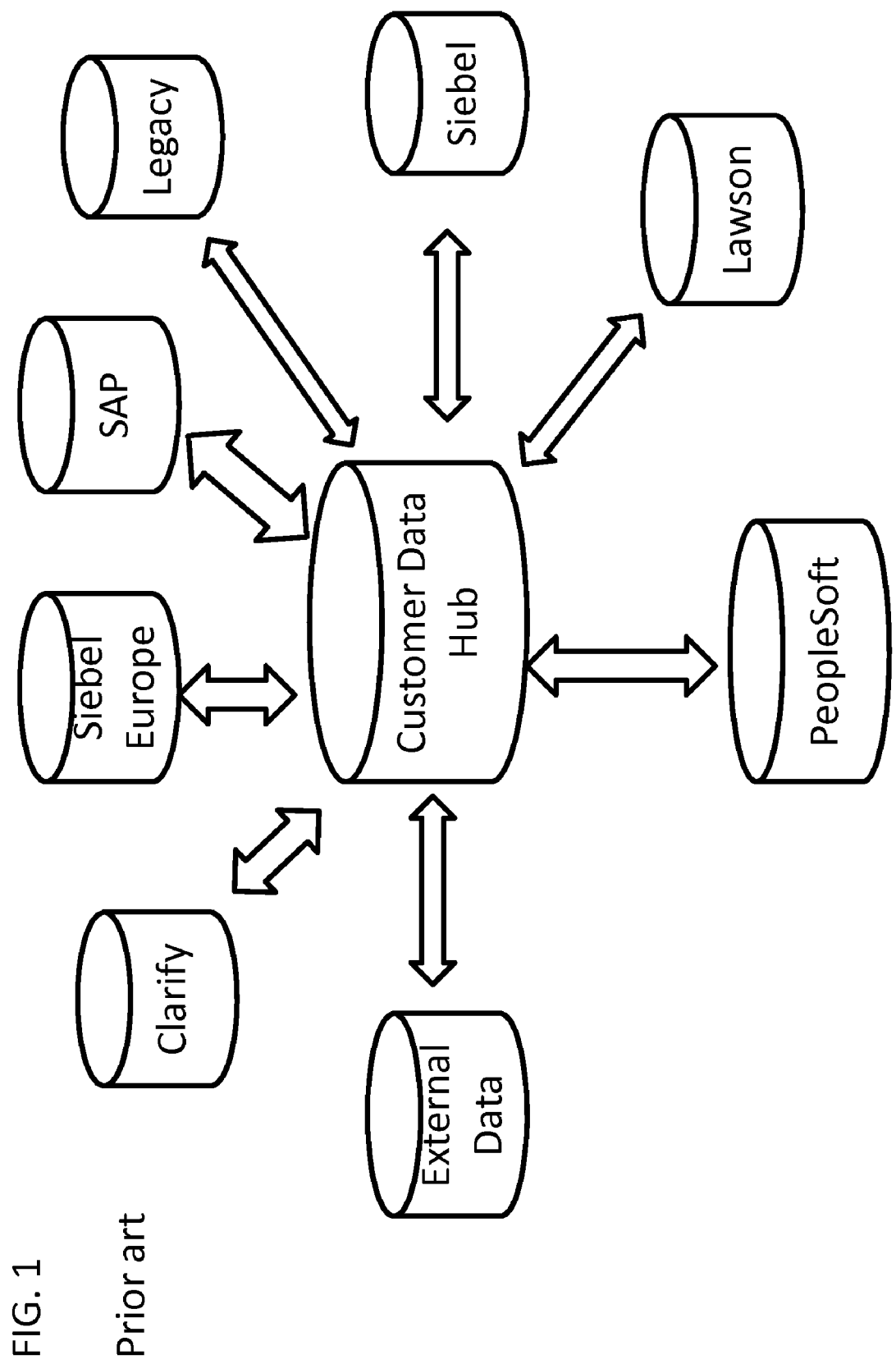
FIG. 1 illustrates a commercial depiction of the prior art EAI architecture.
Figure 2:
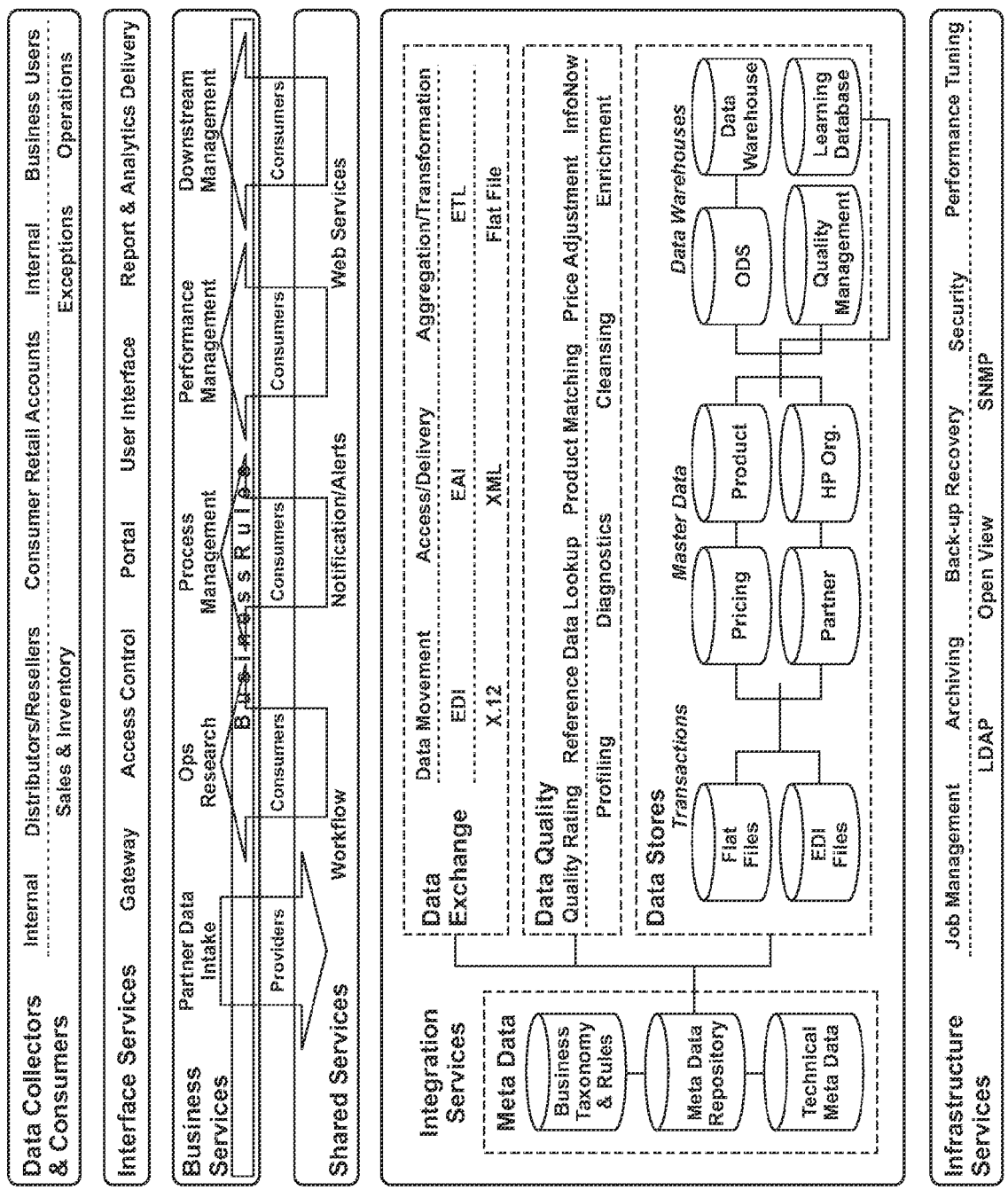
FIG. 2 illustrates a commercial depiction of the prior art SOA architecture.
Figure 3A:
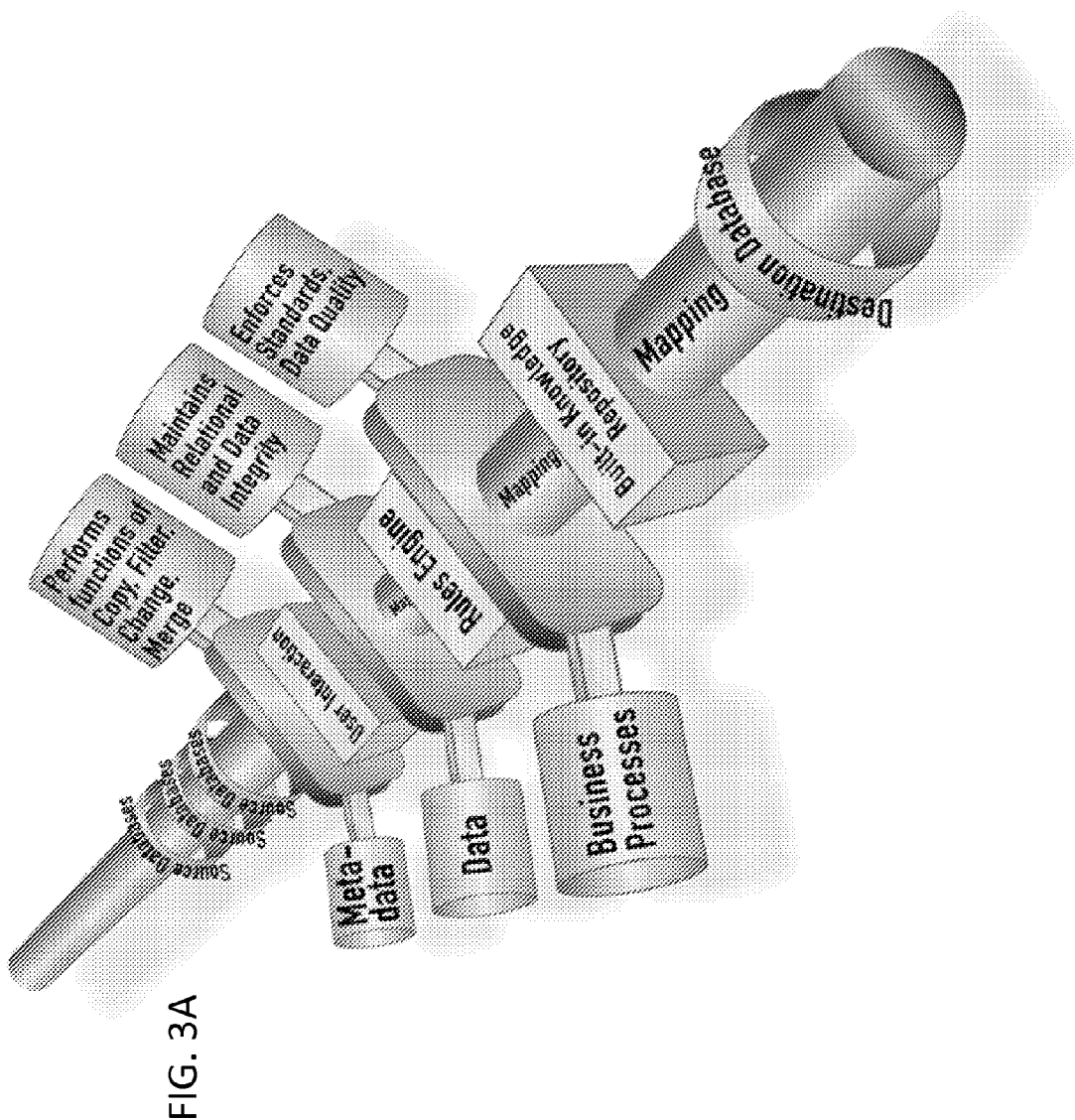
FIG. 3A illustrates one embodiment of a graphical depiction of a method for consolidating databases, in accordance with one aspect of the invention.

FIG. 3A graphically illustrates the methods disclosed in greater detail herein. As shown, three source databases are processed with user interaction to copy, filter, change and merge metadata, data, and business processes maintained in the source databases. A rules engine operates to maintain relational and data integrity and enforce standards and data quality. The metadata, data, and business processes are then mapped to a destination database using a built-in knowledge repository.

FIG. 3B schematically illustrates methods disclosed in greater detail herein. Data from a first database ("DB1") and second database ("DB2") are compared, and an instance comparison report is generated. A first and second temporary database ("TEMP1" and "TEMP2") are loaded and receive various operations. The characteristics (such as metadata and the like) about a destination database that will receive the consolidated DB1 and DB2 are determined. Based on these determined characteristics, the configuration data in TEMP1 and TEMP2 are changed. A data comparison report can be generated to illustrate the results of the data comparison. Any configuration duplicates are resolved in TEMP1 and TEMP2. For example, the configuration duplicates can be identified from the data comparison report. Preferably, quality checks are performed, as detailed below, to differentiate between data that is not duplicative despite a facial similarity, as well as data that is duplicative despite facial dissimilarity. Facially similar but not duplicative data could include similarly numbered data records with different underlying data, while facially dissimilar but duplicative data can include such data as data stored as "TEMPERATURE CONTROLLER" and "THERMOSTAT" or the like.

The data are standardized within each of TEMP1 and TEMP2, and duplicates resolved internally within each of TEMP1 and TEMP2, and then externally between TEMP1 and TEMP2. The transactions are resolved against the opposing TEMP1 or TEMP2 database, and TEMP1 and TEMP2 are merged into a consolidated production database, with data populated from the source databases via TEMP1 and TEMP2.

FIG. 4 illustrates one embodiment of a method 400 for consolidating at least one source database and one target database into a consolidated database in accordance with one aspect of the invention. Method 400 begins at step 405 by identifying a source database including source metadata, source data values, source business processes, and source business rules. The source database can be any database or application, such as Access, Oracle, DB2, SAP, or the like. The source database is, in one embodiment, associated with an acquired business entity, such as a corporation, sole proprietorship, partnership, limited liability company, or the like. At step 408, method 400 identifies a target database including target metadata, target data values, target business processes, and target business rules. The target database can be any database or application, such as Access, Oracle, DB2, SAP, or the like, and does not have to be the same database format as the source database. The target database is, in one embodiment, associated with an acquiring business entity, such as a corporation, sole proprietorship, partnership, limited liability company, or the like. The target database is, in another embodiment, identified as the corporate database and the at least one source database is consolidated into the corporate database.

At steps 410 and 412, method 400 then identifies the source metadata to be included in the consolidated database from the source database and identifies the target metadata to be included in the consolidated database from the target database. The identified source metadata and target metadata are compared at step 414, and any conflicts between the source metadata and target metadata are resolved at step 416. Resolution of conflicts between the source metadata and the target metadata is, in one embodiment managed by a rules engine within the knowledge repository using an iterative conflict resolution method to add to and change the metadata objects of the source metadata and the target metadata. Method 400 then defines, at step 418, a destination metadata of a destination consolidated database based on the at least one source metadata, the target metadata, and the resolved conflicts between the source metadata and the target metadata. The destination metadata is similar to the target metadata in one embodiment. The destination metadata is similar to the source metadata in one embodiment. In another embodiment, the destination metadata is dissimilar to both the source metadata and target metadata.

At step 420, source data values are identified. The source data values are of at least one source to be included in the destination consolidated database. In one embodiment, the source data values are associated with the source database. At step 422, method 400 identifies the target data values to be included in the destination consolidated database, and at step 424, the data values are classified as seed data, codes data, configuration data, master data and transaction data. At step 426, the source data values and target data values are compared. At step 428, method 400 resolves any conflicts between the source data values and the target data values. In one embodiment, the conflicts are resolved using an iterative conflict resolution method. Destination data values are determined at step 430. The destination data values are based on the source data values, the target data values and the resolved conflicts between the source data values and the target data values.

In one embodiment, the iterative conflict resolution method segregates conflicts from conflict candidates into nonduplicate data and duplicate data. The conflict resolution method attempts to determine if facially similar data are substantively different, and whether facially dissimilar data are substantively the same. For example, a data record for "100 South Main St." is facially dissimilar to a data record for "100 Main Street South" and also facially dissimilar to data records for "100 Main Street". In another example data record 300 is facially similar to another data record with the numeric designator 300, but the contents of the data record are not similar. Resolution of conflicts is, in one embodiment, user defined by issuing a request for conflict resolution to a user, and receiving a conflict resolution input responsive to the issued request for conflict resolution. In another embodiment, a rules engine manages the conflict resolution using an iterative conflict resolution method. In another embodiment, data conflicts are resolved using a rule set derived from Boolean logic.

Additionally, at step 434, the sequence of changing and loading data values for the destination database is determined by the classification of data values using the method of changing and loading seed data values first, then sequentially loading configuration data values, then loading master data values, and finally loading transaction data values. In one embodiment of the invention, the sequence of loading data values into the destination is determined by the hierarchy of relationships of data values as determined by the foreign key references wherein a rule of level consistency is applied to load entities at the same level of the hierarchy at the same time.

Additionally, at step 436, the source business processes and source business rules of at least one source are identified, and at step 438, the target business processes and target business rules are identified. At step 440, the source business processes and source business rules and the target business processes and target business rules are compared, and any conflicts between the source business processes and source business rules and the target business processes and target business rules are resolved at step 442 based on the comparison. Resolution of conflicts is, in one embodiment, user defined by issuing a request for conflict resolution to a user, and receiving a conflict resolution input responsive to the issued request for conflict resolution. In another embodiment, a rules engine manages the conflict resolution using an iterative conflict resolution method. In another embodiment, data conflicts are resolved using a rule set derived from Boolean logic.

Destination business processes and destination business rules of the destination consolidated database are defined at step 444 based on the source business processes, source business rules, target business processes, and target business rules, and the resolved conflicts between the source business processes and source business rules and the target business processes and target business rules.

At step 446, the at least one source database and target database are consolidated into a destination consolidated database based on the destination metadata, destination data values, and destination business processes and destination business rules.

In one embodiment, the metadata objects to be included in the consolidated destination database are automatically compared using a series of rules to compare database objects. In another embodiment, the metadata objects to be included in the consolidated destination database are one of automatically created, modified, and changed using a series of metadata rules to create database objects. In one embodiment, the method further includes determining the sequence of consolidating data. In such an embodiment, consolidating data initiates with at least one of the group consisting of seed data, codes data, configuration data, master data, and transaction data.

In one embodiment, when the source data value is exactly identical to the target data value, the method further includes mapping the data values of the at least one source database to the data values of the target database, and wherein when the source data values and the target data values are not identical, the method further comprises defining the data values to be included in the consolidated destination database. In another embodiment, method 400 further includes standardizing nonidentical data values that have the same contextual meaning or are synonyms wherein standardizing comprises eliminating punctuation or capitalization and standardizing abbreviations, codes, and nomenclature for data values. In another embodiment, method 400 further includes comparing at least one data value to another data value to identify candidate duplicate data values wherein a duplicate data value represents the same real-world entity and a set of two or more data records that represent a single real-world entity is called a duplicate set, identifying candidate duplicate data values by a series of duplicate criteria or user-defined rules, merging duplicate records, and populating the resolved duplicate data records into the consolidated destination database. In other embodiments, standardizing data values includes applying at least one data cleansing rule to the relevant data set. In another embodiment, the determination of duplicate data is responsive to related data values associated with the data. For example, when a data set includes model numbers, the metadata includes specifications associated with each model number, and the comparison of the model number specifications determines the duplication of the data. This comparison can be especially relevant when a single supplier uses numerous model names to describe the same product.

In one embodiment, method 400 further includes populating the consolidated destination database with the data values from the at least one source database and the target database with resolved duplicates, consistent data value formats, and unique data values. In another embodiment, the method further includes identifying the database objects that enforce at least one of a business process and a business rule in the at least one source database, identifying the database objects that enforce at least one of a business process and a business rule in the at least one source database in the target database, and determining which at least one of the business process and business rule creates, reads, updates, and deletes each database object in the at least one source database and the target database. In one such embodiment, business processes or business rules that create, read, update, or delete (CRUD) each database object are considered similar business processes or rules.

In one embodiment, at least one of the group consisting of business processes or business rules that have the same input and output data and work flows, business processes or business rules that have the predecessor, successor, and parent processes, business processes or business rules that have the same control constructs business processes or business rules that have the same triggering controls, business processes or business rules that have the same conditional controls, business processes or business rules that have the same sequencing controls, business processes or business rules that have the same concurrence controls, business processes or business rules that have the same repetition controls, business processes or business rules that have the same pausing controls, business processes or business rules that have the same resuming controls, and business processes or business rules that have the same exiting controls are considered similar business processes or rules. In one embodiment, two business processes are equivalent if the business process or business rule share the same context and are defined by at least one of the group consisting of business process or rule type, similar roles in the CRUD matrix, input and output data and work flows, predecessor, successor, and parent processes, and control constructs.

Figure 5:
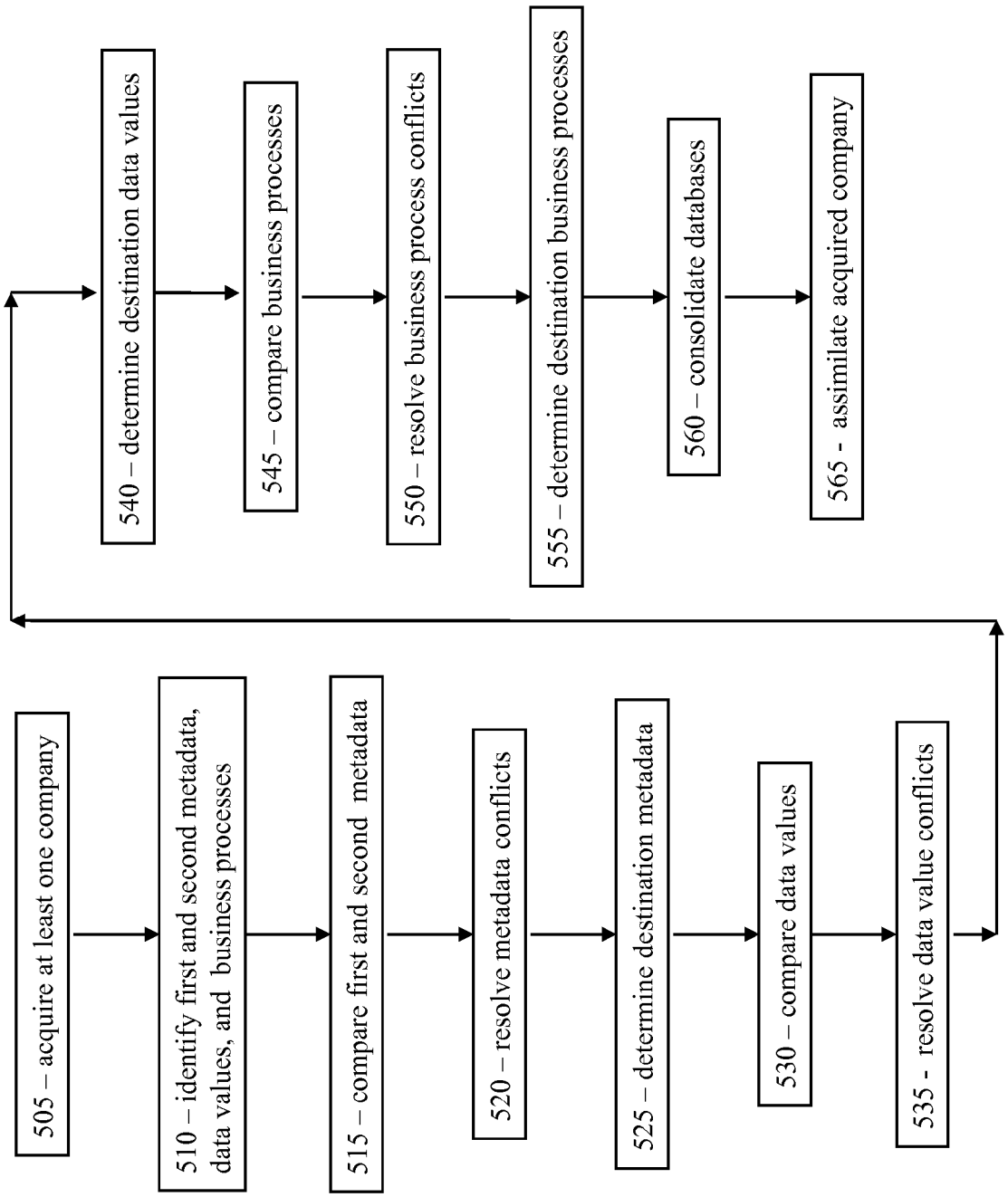
FIG. 5 illustrates one embodiment of a method for consolidating databases in accordance with another aspect of the invention.

FIG. 5 illustrates one embodiment of a method 500 for assimilating an acquired company, in accordance with one aspect of the invention. Method 500 begins at step 505 by acquiring at least one company. The acquired company maintains at least one first database including first metadata, first data values, and first business processes. The acquiring company maintains at least one second database, the second database including second metadata, second data values, and second business processes. The company can be any business entity, such as a corporation, Limited Liability Corporation, sole proprietorship, partnership, or the like. Method 500 continues at step 510 by identifying the first metadata, second metadata, first data value, second data value, first business processes, and second business processes. At step 515, the first metadata and second metadata are compared, and at step 520 any conflicts between the first metadata and second metadata are resolved based on the comparison. At step 525, method 500 determines a destination metadata based on the first source metadata, second metadata and resolved conflicts between the first metadata and second metadata.

The first data values and second data values are compared at step 530, and duplicate data candidates are determined based on the comparison. Duplicate data candidates are data records that are facially similar. At step 535, method 500 determines whether the duplicate data candidate is a nonduplicate data or a duplicate data. Facial similarity is determined, in one embodiment, by a comparison between records such that two data records are determined to be facially similar if a threshold is exceeded, such as a statistical threshold or a threshold determined responsive to Boolean logic.

Having determined whether the duplicate data candidate is a nonduplicate data or duplicate data, step 540 determines a destination data values based on the first data values, second data values, determined duplicate data, and determined nonduplicate data.

The first business process and second business process are compared at step 545, and any conflicts between the first business process and second business process based on the comparison are resolved at step 550. Conflict resolution, in one embodiment, is implemented with an iterative conflict resolution method. In one embodiment, conflict resolution is implemented with one of the methods described above. The destination business process is then determined based on the first business process, second business process and resolved conflicts between the first business process and second business process, at step 555. At step 560, the first database and second database are consolidated into a destination database based on the destination metadata, destination data values, and destination business processes. The acquired company is then assimilated, at step 565 based on the consolidated destination database.

In one embodiment, the first database includes first customer data, first supplier data, and first inventory data, and the second database includes second customer data, second supplier data, and second inventory data. In one embodiment, consolidating the first database and second database comprises creating the destination database and populating the destination database with nonduplicate data based on a comparison of first customer data with second customer data, a comparison of first supplier data with second supplier data, and a comparison of first inventory data with second inventory data.

Figure 6:
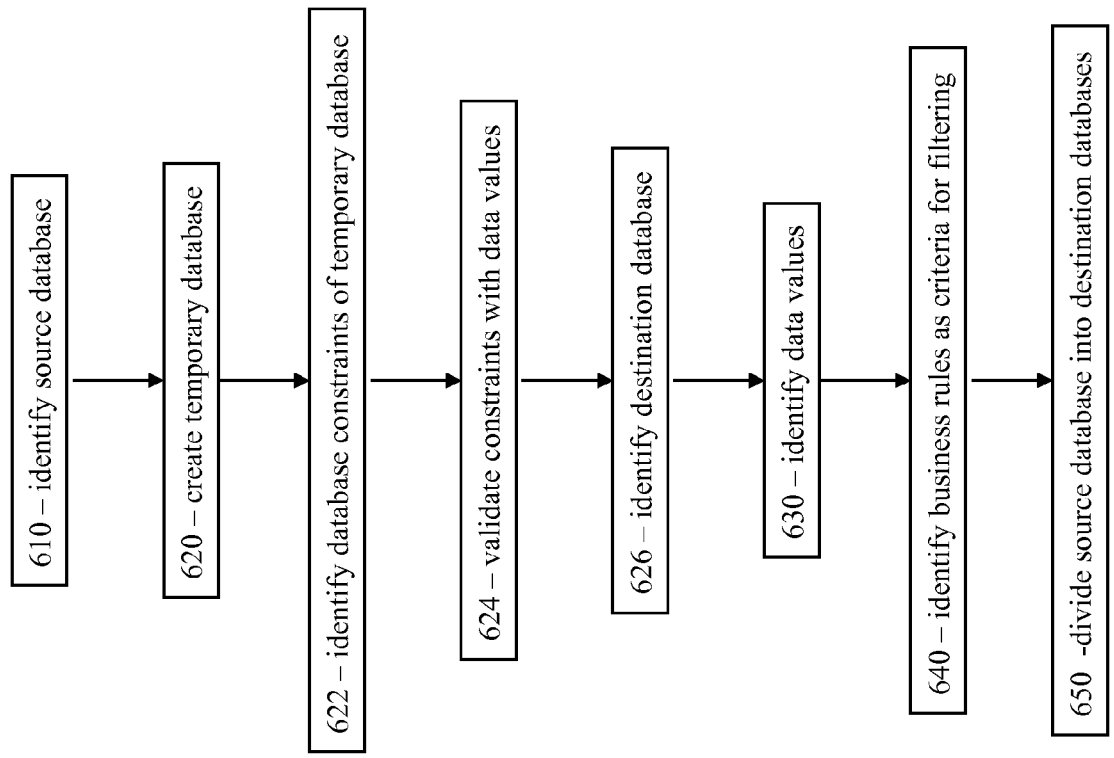
FIG. 6 illustrates one embodiment of a method for separating databases in accordance with another aspect of the invention.

FIG. 6 illustrates one embodiment of a method for dividing at least one source database into at least one destination database, in accordance with one aspect of the invention. Method 600 begins at step 610 by identifying a source database associated with a parent business entity, the source database including source data values, and at step 620 by creating a temporary database which is a mirror image of the source database. Step 622 identifies the database constraints of the temporary source database. Step 624 validates the constraints with data values. Step 626 includes identifying a destination database associated with a divested business entity, the destination database including destination data values. Data values of the at least one source are identified at step 630 to be included in the destination database, and the business rules of at least one source that will be the criteria for filtering out the data values for the at least one destination database are identified at step 640.

The source database is divided into the at least one destination database based on the identified business rules at step 650. Dividing the source database results in data values that were stored in a single database being divided into two databases, each associated with the appropriate ownership so that data values, associated with a divested business entity are maintained in a database separated from the data values associated with the parent business entity maintaining such association.

In one embodiment, method 600 further includes populating the at least one destination database starting with seed data, codes data, configuration data, master data, and transaction data.

The criteria used in deciding whether a particular metadata, data, or business process are associated with the parent entity or with the divested entity, in one embodiment, is determined based one of a user input and Boolean logic.

Figure 7:
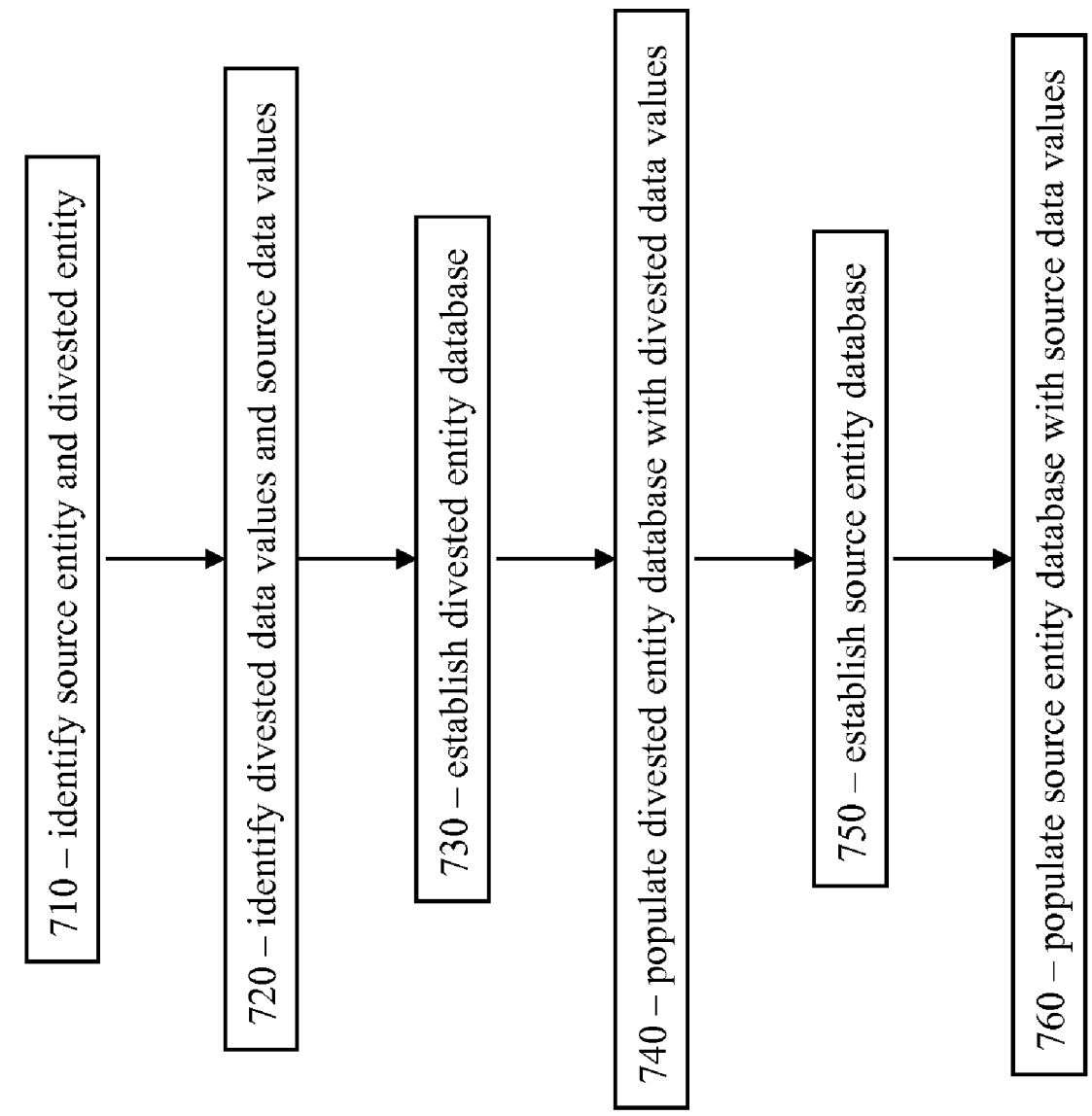
FIG. 7 illustrates one embodiment of a method for separating databases in accordance with another aspect of the invention and FIG. 8 illustrates one embodiment of a method of divesting database data in accordance with another aspect of the invention.

FIG. 7 illustrates one embodiment of a method for divesting at least a part of a business entity that maintains at least one source database, in accordance with one aspect of the invention. Method 700 begins at step 710 by identifying a source entity and a divested entity and identifying divested data values associated only with the divested entity at step 720. Source data values associated only with the source entity are identified at step 725, and a divested entity database is established at step 730. The divested data values are used to populate the divested entity database at step 740. A source entity database is established at step 750, and the source entity database is populated with the source data values at step 760.

As used herein, the terms "first database", "second database", "source database", and "target database" and the like are used descriptively, and can be applied to a single database, or a plurality of databases.

Figure 8:
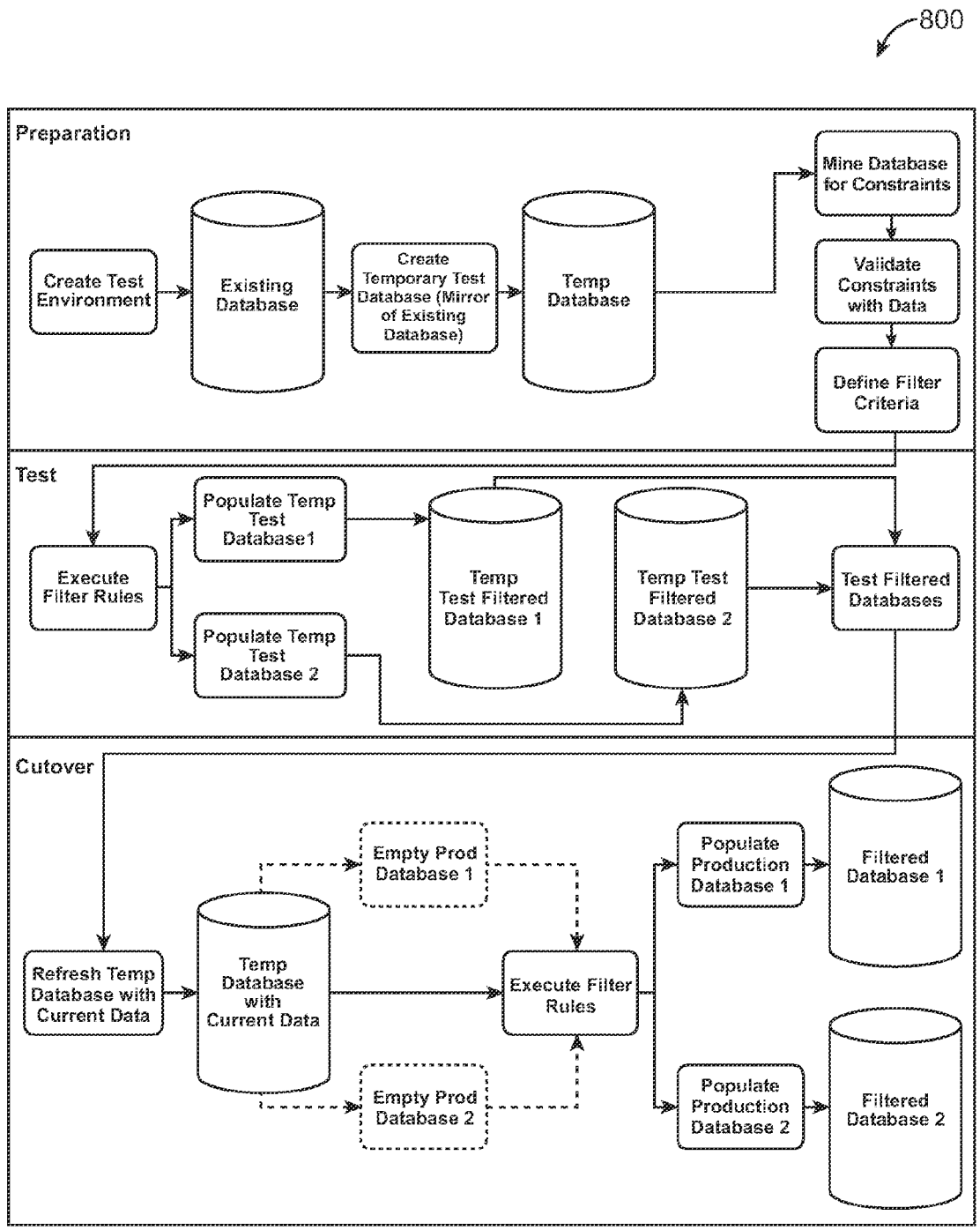

FIG. 8 illustrates one embodiment of a method for divesting data in database in accordance with one aspect of the invention. FIG. 8 illustrates three distinct phases of the method—preparation, testing, and cutover. During preparation, a test environment is created, and existing databases are duplicated into mirrors of test databases. These mirrors are mined for constraints, and these constraints are validated using appropriate data validation techniques, such as those described above. The validated constraints are then used to define filter criteria for use in the testing phase.

The testing phase begins by executing the filtering rules to populate test databases populated with data values based on the filters. These populated and filtered databases are then tested in preparation for cutover.

During cutover, the temp databases are refreshed with current data and emptied into product databases based on the executed filtering rules. The production databases are then populated based on these rules to attain the filtered databases.

Furthermore, the methods of mining metadata from any of the databases can be implemented in a number of fashions. In one embodiment, the method of mining the metadata from the at least one source and from the target includes identifying the database objects of the at least one source and the target, and for each metadata object, identifying whether that the source metadata object is exactly identical to the target metadata object. The determination of exactly identical can require complete identity, or can be measured using a statistical threshold. Any differences between the source metadata objects and the target metadata objects are identified for those objects that are not identical. Differences between the metadata objects can include, but are not limited to objects that exist in the source, but not in the target, objects that exist in the target, but not in the source, or objects that have different characteristics in the source than those in the target. The objects to be included in the consolidated destination database are defined based on the differences between metadata objects and the identical objects.

In one embodiment, the mapping of the database objects establishes the type of object. Object types include schemas, associations, classes, properties, methods, aliases, tables, columns, entities, domains, definitions, data type, packages, procedures, program modules, triggers, forms, screens, domains, attributes, relationships, primary key constraints, unique key constraints, check constraints, mandatory constraints, conditional constraints, cardinality or range constraints, and foreign key constraints.

In another embodiment, the database objects are mined automatically and without user interaction. In such embodiments, the objects are then compared to objects in a knowledge repository. In one such embodiment, a rules engine operates on the compared objects to determine the identity of the compared objects, and their differences. In other embodiments, the database objects are manually mined using user interactions, and the discovered database objects are added to the knowledge repository. The comparisons disclosed herein can be compared automatically, such as with a rules engine, or manually.

The identified metadata objects to be included in the consolidated destination database can be added to the target database to form the consolidated destination database in one embodiment. In such embodiments, any different metadata objects are modified to conform to the target metadata prior to population in the consolidated destination database.

The metadata objects to be included in the consolidated destination database are automatically created using a series of metadata rules to create database objects in one embodiment. In one such embodiment, the characteristics of the metadata objects to be included in the consolidated destination are changed to reflect different characteristics of the metadata objects of the at least one source metadata objects and the metadata objects of the target.

Data from the at least one source and the target are classified as seed data, codes data, configuration data, master data, or transaction data. In one embodiment, data is handled according to a set of rules. In one such embodiment, the rules that determine the sequence in which data is populated or changed in the destination database include at least one rule from the list including but not limited to restrictions on references between data layers, such as entities in a given layer never reference, or have foreign keys that refer to, entities in a lower level. Another exemplary data rule mandates that all references from an entity are on the same or higher levels. This is also known as level consistency.

In one embodiment, the sequence of consolidating data is controlled. In one control algorithm, consolidating data must be done starting with seed data, then codes data, then configuration data, then master data, and then transaction data.

In one embodiment, the comparison between data values stored in the separate databases includes mapping the data values of the at least one source database to the data values of the target database and identifying the differences between the source data values and the target data values for those data values that are not identical. The differences can be absolute, or relative in various embodiments. Differences might include, but are not limited to data values that exist in the source, but not in the target, data values that exist in the target, but not in the source, and data values that have different characteristics in the source than those in the target. Based on these differences, or lack thereof, the data values to be included in the consolidated destination database are defined. In one embodiment, non-identical data values that have the same contextual meaning or are synonymous are standardized by eliminating punctuation or capitalization, standardizing abbreviations, codes, and nomenclature for data values. Other data standardization techniques can be used, such as changing data stored as "FULL NAME" to "LAST NAME and FIRST NAME" or similar standardization techniques. The method of comparing at least one data value to another data value to identify candidate duplicate data values wherein a duplicate data value represents the same real-world entity and a set of two or more data records that represent a single real-world entity is called a duplicate set. Candidate duplicate data values by a series of duplicate criteria or user-defined rules can be merged if duplicates and the resolved duplicate data records can be populated into the consolidated destination database. One exemplary rule for a rule engine handling duplicates includes grouping data records according to common characteristics. Another exemplary rule for handling duplicates/nonduplicates includes at least one duplicate merging rule. One duplicate merging rule requires that descriptions of the two or more records that comprise a duplicate set into a single description will be the description of the single new record that will replace all the duplicates in the consolidated database destination. In one embodiment, the merging rules are executed by a rules engine. In one embodiment, these merging rules define, for example, the sequence of merging duplicates, changing the primary key of merged records, and result in reducing the duplicate records in each set to a single record for storage in the destination database. In other embodiments, the duplicate resolution rules are user defined based on either defined criteria and/or Boolean logic. Any record that survives a merger or determination of a duplicate conflict is termed a survivor record.

In embodiments using user interaction for conflict resolution, the interaction includes, in one embodiment, presenting the conflict to at least one user, and requesting conflict resolution based on the presenting. The conflict resolution method further receiving a conflict resolution input from the user, and uses the user defined conflict resolution as the base for the determination of the conflict and/or survivor record.

In one embodiment, methods for determining how to resolve duplicate records and implementing that step to physically merge records includes rules to maintain the relational integrity of the merged record throughout the database by locating all foreign key references to the merged record and changing that reference to the new merged record. In such embodiments, the order of operations is controlled. In one embodiment, these controls include incremental duplications using different duplicate rules to identify additional duplicate candidate sets after an initial set of candidate duplicates are resolved.

In one embodiment, child records of the duplicates records are also resolved to maintain relational integrity. In one such embodiment, the resolution can be implemented with user interaction, providing the user has the choice of creating the union of the children records whereby all children of all records in the duplicate set become children of the resolution record, or retaining only the original children of the survivor record as the children of the new record, or allowing the user to select the children to be preserved. In other embodiments, other user rules are provided. In another embodiment, identifier clashes are resolved among the child records. In one embodiment, child records of deleted records are deleted after controlling for data retention and relational integrity. In another embodiment, the conflict resolution methods retire original records that were duplicates. Retiring records can include deleting old records with their child records, deactivating old records such that the data remains in the database but with an indication, such as a flag, of inactivity. In other embodiments, retiring the records includes archiving the old records, such as by moving them to a separate archive database. In one embodiment, the retirement method is user selected, while in others, the retirement method is selected by a rules engine.

In one embodiment, the format of the source data values is mapped from the source database to the format of the target data values in the target database. In one embodiment, this mapping includes identifying identical formats of the data values, identifying conflicts in the formats of the data values, and identifying the format of the data value to be in the destination database.

Differences between the source data value format and the target data value format are reconciled, in one embodiment. In one such embodiment, the reconciliation is obtained by changing the source data format, while in other embodiments, the reconciliation is responsive to changing the target data format. In yet other embodiment, both the source data format and target data format are changed.

In one embodiment, the consolidated destination database is populated with the data values from the at least one source database and the target database with resolved duplicates, consistent data value formats, and unique data values.

The method disclosed above can further include identifying for each business process and business rule whether the source business process or business rule is exactly identical (equivalent) to the target business process or business rule. Based on that identification, the business processes and business rules of the at least one source database is mapped to the business processes and business rules of the target database. Furthermore, the differences between the source business processes or business rules and the target business processes or business rules are identified for those business processes or business rules that are not identical. For example, those differences might include, but are not limited to business processes or business rules that exist in the source, but not in the target, business processes or business rules that exist in the target, but not in the source, or business processes or business rules that are inconsistent between the source and those in the target. After identifying the identical records and the records that are different, the business processes or business rules to be included in the consolidated destination database are identified. In one embodiment, these identified destination business processes and business rules are then populated into the consolidated destination database. In one embodiment, these methods further include identifying the database objects that enforce a business process or business rule in the at least one source database and in the target database and determining which business process or business rule creates, reads, updates, and deletes each database object in the at least one source database and the target database.

These business processes or business rules that create, read, update, or delete (CRUD) each database object are considered similar business processes or rules. In other embodiments, business processes or business rules that have the same input and output data and work flows are considered similar business processes or rules. In another embodiment, business processes or business rules that have the predecessor, successor, and parent processes are considered similar business processes or rules. In another embodiment, business processes or business rules that are of the same type are considered similar business processes or rules. In another embodiment, business processes or business rules that have the same control constructs such as triggering controls, conditional controls, sequencing controls, concurrence controls, repetition controls, pausing controls, resuming controls, and exiting controls are considered similar business processes or rules. In one embodiment, the methods further include creating a list of similar business processes or rules for the at least one source database and the target database.

Having determined the similar business processes, the methods disclosed herein further compare the similar business processes or rules of the at least one source database to the businesses processes or rules to determine equivalent business processes or rules. Two business processes are equivalent if the business process or business rule share the same context and is defined by business process or rule type, similar roles in the CRUD matrix, input and output data and work flows, predecessor, successor, and parent processes, and control constructs. Then, in one embodiment, the conflicts in business processes or rules between the at least one source and the target are identified. Then, any conflicts are resolved for the business processes or rules between the at least one source and the target. This method includes adding database objects that enforce the business process or business rule to the at least one source, adding database objects that enforce the business process or business rule to the target, changing the database objects that enforce the business process or business rule in the at least one source, changing the database objects that enforce the business process or business rule in the target, and defining the business process or business rule that will be populated into the consolidated destination database.

In one embodiment, the business rules that will populate the consolidated destination database are identified with user interaction, such as interactions that include presenting the conflict to at least one user, requesting conflict resolution based on the presenting, and receiving a conflict resolution input from the user. In other embodiments, the consolidated destination database is populated with the resolved business rules.

In one embodiment, the target database includes target customer data, target supplier data, and target inventory data, and wherein the source database includes source customer data, source supplier data, and source inventory data, and wherein consolidating the target database and source database comprises creating the destination database and populating the destination database with nonduplicate data based on a comparison of source customer data with target customer data, a comparison of source supplier data with target supplier data, and a comparison of source inventory data with target inventory data.

The at least one source and the at least one destination include, in one embodiment, metadata objects including but not limited to object types as schemas, associations, classes, properties, methods, aliases, tables, columns, entities, domains, definitions, data type, packages, procedures, program modules, triggers, forms, screens, domains, attributes, relationships, primary key constraints, unique key constraints, check constraints, mandatory constraints, conditional constraints, cardinality or range constraints, and foreign key constraints. In one embodiment, the foreign key constraints are used to identify related data values. In other embodiments, user interaction determines at least one business filter rule or criteria for dividing the data. For example, the user can include use of Boolean logic to create business filter rules or criteria for dividing the data values. In one embodiment, the foreign key constraints identify data values that must be populated together into the at least one destination database so as not to violate the relational integrity of the at least one destination database.

In another embodiment, the at least one destination database can be the database to support a divestiture with the divested company having its own data values separate from the parent company and the parent company having its own data without the data values of the divested company.

One embodiment of the invention is a method for divesting data in database in accordance with one aspect of the invention. In this embodiment, the method has three distinct phases—preparation, testing, and cutover. During preparation, a test environment is created, and existing databases are duplicated into mirrors of test databases. These mirrors are mined for constraints, and these constraints are validated using appropriate data validation techniques, such as those described above. The validated constraints are then used to define filter criteria for use in the testing phase.

The testing phase begins by executing the filtering rules to populate test databases populated with data values based on the filters. These populated and filtered databases are then tested in preparation for cutover.

During cutover, the temp databases are refreshed with current data and emptied into product databases based on the executed filtering rules. The production databases are then populated based on these rules to attain the filtered databases.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

I claim:

1. A method for consolidating at least one source database and one target database into a consolidated database using a computer, the method comprising:
   identifying one or more source databases, the source databases including source metadata, source data values, source business processes, and source business rules;
   identifying a target database, the target database including target metadata, target data values, target business processes, and target business rules;

discovering the source metadata to be included in the consolidated database;
identifying differences between at least one source metadata and the target metadata;
resolving any conflicts between at least one source metadata and the target metadata based on the identified differences;
defining a metadata of the consolidated database based on at the least one source metadata, the target metadata, and the resolved conflicts between the source metadata and the target metadata;
identifying the source data values of at least one source to be included in the consolidated database;
identifying differences between the source data values and the target data values;
resolving any conflicts between the source data values and the target data values based on the identified differences;
defining data values of the consolidated database based on the source data values, the target data values and the resolved conflicts between the source data values and the target data values;
discovering the source business processes and source business rules of at least one source;
identifying the target business processes and target business rules;
comparing differences in source business processes and source business rules and the target business processes and target business rules;
resolving any conflicts between the source business processes and source business rules and the target business processes and target business rules based on the comparison;
defining consolidated business processes and consolidated business rules of the consolidated database based on the source business processes, source business rules, the target business processes, and the target business rules, and the resolved conflicts between the source business processes and source business rules and the target business processes and target business rules;
wherein resolving conflicts between the source metadata and target metadata, source data values and target data values, further comprises mining every property of the source database and target database; and
  wherein the mining of database objects is based on a rule set automatically derived from the analysis of the source database and of the target database; and
  wherein mining the databases further comprises dynamically and automatically analyzing and comparing each of the one or more source database objects and values with the corresponding target database objects and values, and for each comparison determining which source database objects and target database objects are identical; and
    wherein at least one source and target database object are determined to be duplicates because the one or more source database objects and values and target database objects and values are identical; and
    automatically reconciling duplicate database objects by merging the duplicates into a single consolidated database object with corresponding metadata based on the consolidated business rules; and
    wherein at least one source and target database object are determined to be non-duplicates because the one or more source database objects and values and target database objects and values are not identical; and
    automatically reconciling non-duplicate database objects by creating an instance of a consolidated database object with associated metadata based on the consolidated business rules; and
when at least one conflict between the source database object and target database object is not resolved a request for conflict resolution is automatically posted to a user for reconciliation; and
consolidating the at least one source database and target database into the consolidated database based on the consolidated metadata, consolidated data values, and consolidated business processes and consolidated business rules;
  wherein consolidating the at least one source database and target database into a consolidated database comprises applying at least one rule selected from the group consisting of an entity in a given layer never references an entity in a lower level, and all references from an entity are on the same or higher levels; and
    further comprising determining the sequence of consolidating data and wherein consolidating data initiates with at least one of the group consisting of seed data, codes data, configuration data, master data, and transaction data; and
storing the consolidated, database in a memory.

2. The method of claim 1 wherein the metadata objects to be included in the consolidated database are automatically compared using a series of rules to compare database objects.

3. The method of claim 1 wherein the metadata objects to be included in the consolidated database are automatically created or changed using a series of metadata rules to create database objects.

4. The method of claim 1 wherein when the source data value is exactly identical to the target data value, the method further comprises;
mapping the data values of the at least one source database to the data values of the target database, and wherein when the source data values and the target data values are not identical, the method further comprises defining the data values to be included in the consolidated database.

5. The method of claim 1 further comprising: standardizing non-identical data values that have the same contextual meaning or are synonyms wherein standardizing comprises eliminating punctuation or capitalization and standardizing abbreviations, codes, and nomenclature for data values.

6. The method of claim 1 further comprising:
comparing at least one data value to another data value to identify candidate duplicate data values wherein a duplicate data value represents the same real-world entity and a set of two or more data records that represent a single real-world entity is called a duplicate set;
identifying candidate duplicate data values by a series of duplicate criteria or user-defined rules;
merging duplicate records; and
populating the resolved duplicate data records into the consolidated database.

7. The method of claim 1 further comprising conflicts are resolved using at least one rule using Boolean logic.

8. The method of claim 1 further comprising receiving at least one user input, and wherein at least one candidate duplicate conflict is resolved responsive to the user input.

9. The method of claim 8 wherein receiving the user input comprises:
presenting the conflict to at least one user; requesting conflict resolution based on the presenting;
and receiving a conflict resolution input from the user.

10. The method of claim 1 further comprising:
populating the consolidated destination database with the data values from the at least one source database and the target database with resolved duplicates, consistent data value formats, and unique data values.

11. The method of claim 1 further comprising:
identifying the database objects that enforce at least one of a business process and a business rule in the at least one source database;
identifying the database objects that enforce at least one of a business process and a business rule in the at least one source database in the target database;
determining which at least one of the business process and business rule creates, reads, updates, and deletes each database object in the at least one source database and the target database.

12. The method of claim 11 whereby business processes or business rules that create, read, update, or delete (CRUD) each database object are considered similar business processes or rules.

13. The method of claim 11 wherein similar business processes or business rules are one or more of the group comprising:
(a) business processes or business rules that have the same input and output data and work flows, or
(b) business processes or business rules that have the same predecessor, successor, and parent processes, or
(c) business processes or business rules that have the same control constructs, or
(d) business processes or business rules that have the same triggering controls, or
(e) business processes or business rules that have the same conditional controls, or
(g) business processes or business rules that have the same sequencing controls, or
(h) business processes or business rules that have the same concurrence controls, or
(i) business processes or business rules that have the same repetition controls, or
(j) business processes or business rules that have the same pausing controls, or
(k) business processes or business rules that have the same resuming controls.

14. The method of claim 1 wherein the target database is associated with at least one of the group consisting of an acquired company and an acquiring company, and wherein the source database is associated with at least one of the group consisting of an acquired company and an acquiring company.

* * * * *